Figure 1:
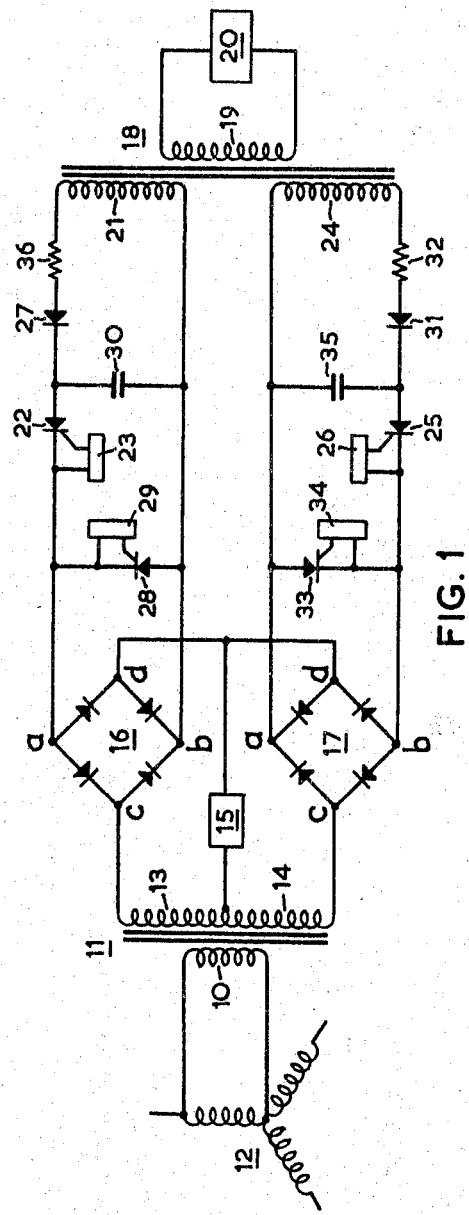

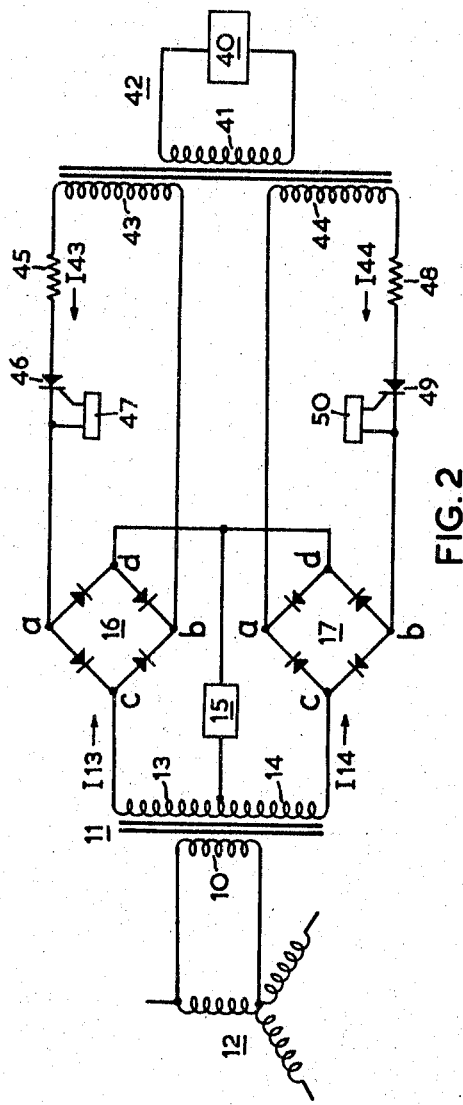
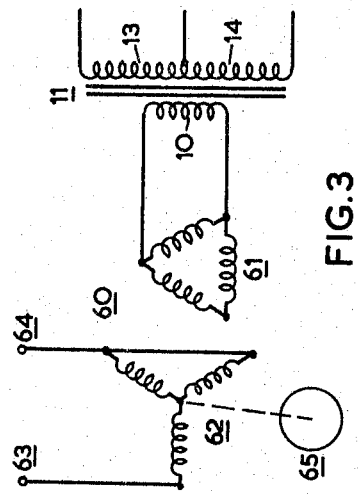
FIG. 2
FIG. 3

United States Patent Office 3,324,375
Patented June 6, 1967

3,324,375
APPARATUS FOR SUPPLYING FULLWAVE RECTIFIED CURRENT FROM AN A.C. SOURCE TO A LOAD
Noel Pearce, Slough, Bucks, England, assignor to The English Electric Company Limited, London, England, a British company
Filed Dec. 17, 1963, Ser. No. 331,159
Claims priority, application Great Britain, Dec. 19, 1962, 47,905/62
2 Claims. (Cl. 321—7)

This invention relates to apparatus for controlling the supply of electric current to a load whereby the load may be supplied with current of either one or the other polarity, or with current which changes alternately from one to the other polarity at a desired frequency which may be a very low frequency.

According to the invention apparatus for controlling the supply of electric current to a load includes switching means for connection between a load and a source of A.C. voltage, control means for controlling the switching means so as to energise the load with full wave rectified current from said source, and means for changing the phase of the voltage supplied from said source thereby to change the polarity of the current supplied to the load.

According to one feature of the invention the switching means comprise rectifier means which normally prevent any current flow between the A.C. source and the load.

According to another feature of the invention the means for changing the phase of the voltage supplied from the source comprises a power selsyn whereby the load may be supplied with a sinusoidal alternating current the frequency of which is proportioned to the speed of rotation of the rotor of the selsyn.

According to a further feature of the invention there is provided a motor control circuit for a single or polyphase induction or synchronous motor in which the or each phase of the motor is supplied with current by apparatus as described above.

Two basic forms of apparatus for controlling the supply of electric current to a load in accordance with the invention will now be described, by way of example, with reference to the accompanying drawings in which both FIGS. 1 and 2 are simplified circuit diagrams of a single phase form of apparatus in accordance with the invention, and FIG. 3 is a simplified circuit diagram of a modification of the invention and which can be applied to the arrangements of both FIGS. 1 and 2.

In FIG. 1 the primary winding 10 of a transformer 11 is arranged to be supplied from one phase of an A.C. supply voltage source 12 and the two parts 13 and 14 of the centre tapped secondary winding of the transformer are arranged to supply a load 15 through two rectifier circuits generally indicated at 16 and 17.

Between the two diagonally opposite junctions c and d of each of the rectifier circuits 16 and 17 these two circuits are normally non-conducting, but if these two rectifier circuits are rendered alternately conducting between the junctions c and d of their arms then the load will be supplied with full wave rectified current from the transformer 11.

In order to render these two rectifier circuits suitably conducting a control circuit is provided which includes a silicon controlled rectifier 28, connected across the two junctions a and b of the bridge circuit 16, a trigger circuit 29 for the rectifier 28, a silicon controlled rectifier 33, connected across the two junctions a and b of the rectifier circuit 17, and a trigger circuit 34 for the rectifier 33.

The two trigger circuts 29 and 34 are arranged to render the silicon controlled rectifiers 28 and 33 alternately conducting and these two rectifiers will return automatically to their non-conducting state when the voltage from the respective half of the secondary winding 13 or 14 passes through zero.

The circuit so far described operates satisfactorily and as described providing the load 15 is either a resistive load or has only a relatively small inductive component and with such a load operation of the circuit is as follows.

Assuming, for example, the junction point c of the rectifier circuit 16 to be positive and the silicon controlled rectifier 28 has been rendered conducting then current can flow through the rectifier unit connected between the junctions c and b of the rectifier circuit 16, through the silicon controlled rectifier 28, through the rectifier unit connected between the diagonals a and d of rectifier circuit 16 to the load 15.

As previously stated the two rectifiers 28 and 33 are rendered alternately conducting so that when the silicon controlled rectifier 28 becomes non-conducting, the silicon controlled rectifier 33 will have been rendred conducting by its trigger circuit 34 so that the rectifier circuit 16 will have become non-conducting between its junctions c and d whilst the rectifier circuit 17 will have become conducting between its junction c and d to allow current to flow through the load 15, in the same direction as the previous current through the rectifier circuit 16.

However, if the phase of the supply voltage source 12 is reversed by any suitable means (not shown) the direction of current flow through the load will also be reversed.

Thus the load 15 can be supplied with current of one or the other polarity as desired, or it can be supplied with an alernating current the frequency of which is dependent upon the rate at which the phase of the source 12 is reversed, and the current supplied to the load can thus be of a very low frequency. A modification of the circuit for achieving this is described later in relation to FIG. 3.

If however, the load 15 is highly inductive the two silicon controlled rectifiers 28 and 33 will not return to their non-conducting state but will continue to conduct so that the secondary windings 13 and 14 of the transformer 11 are short circuited through the rectifier circuits 16 and 17 and in order to ensure that this does not occur with an inductive load both rectifiers 29 and 34 are provided with "put off" circuits.

These two "put off" circuits comprise a common source of alternating current voltage 20 fed to the primary winding 19 of a transformer 18 which has two secondary windings 21 and 24.

The secondary winding 21 is connected across the silicon controlled rectifier 28 through a further silicon controlled rectifier 22 having a trigger circuit 23, and through a diode 27, and a current limiting resistor 36 with a capacitor 30 connected between the junction of the rectifier 22 and the diode 27 and the other side of the transformer secondary winding 21.

A similar "put off" circuit for the silicon controlled rectifier 33 is provided associated with the transformer secondary winding 24 and comprises a current limiting resistor 32, a diode 31, a silicon controlled rectifier 25 wth a trigger circuit 26 and a capacitor 35.

The trigger circuit 23 operates to render the silicon controlled rectifier 22 conducting at the same time as the rectifier 33 is rendered conducting by the trigger circuit 34 and the trigger circuit 26 operates to render the silicon controlled rectifier 25 conducting at the same time as the silicon controlled rectifier 28 is rendered conducting by the trigger circuit 29.

Thus the trigger circuit 34 operates to render the rectifier 33 conducting when the trigger circuit 23 renders the silicon controled rectifier 22 conducting at a time when the voltage across the silicon controlled rectifier is at or approaching zero, thus the rectifier 22 enables the capacitor 30, which will have become charged through the diode 27 from the transformer 18, to discharge through the rectifier circuit 16 thus enabling the load current to be continued from the capacitor so that the voltage across the silicon controlled rectifier 28 can fall to zero so that it becomes non-conducting. The "put off" circuit of the rectifier circuit operates in a similar manner.

FIG. 3 shows in more detail how the circuit of FIG. 1 is modified so as to supply the load with a sinusoidal current of a desired frequency. In FIG. 3 there is shown the transformer 11 of FIG. 1 with the primary winding 10 and the two parts 13 and 14 of the centre tapped secondary, the rest of the circuit associated with the secondary windings 13 and 14 is not shown as it is the same as for FIG. 1.

In FIG. 3, however, the alternating current supply voltage source is replaced by a power selsyn generally indicated at 60 and having a rotor winding 62 and a delta connected three phase stator winding 61 with the primary winding 10 connected across one phase thereof.

The rotor winding 62 of the selsyn is arranged to be supplied with alternating current power at terminals 63 and 64 and the rotor winding rotated by a diagrammatically illustrated motor 65.

If, therefore, the rotor of the selsyn is rotated by the motor the load will be supplied with a sinusoidal current the frequency of which is equal to the frequency of modulation of the selsyn stator output, that is, equal to the speed of rotation of the selsyn rotor winding which can be rotated at a very low speed so that the load is supplied with a current at a very low frequency.

FIG. 2 shows another embodiment of the invention more suitable for supplying a resistive load and in which like parts have the same reference numerals as in FIG. 1.

FIG. 2 thus shows two rectifier circuits 16 and 17 connected to a transformer 11 fed from a source 12 and supplying a load 15.

In order to render the two rectifier circuits 16 and 17 alternately conducting in this embodiment of the invention a control circuit is provided which comprises a common source of square wave alternating current reference voltage 40 fed to the primary winding 41 of a transformer 42 having two secondary windings 43 and 44.

The primary winding 43 is connected across the junction *a* and *b* of the arms of the rectifier circuit 16 in series with a current limiting resistor 45 and a silicon controlled rectifier 46 which has a trigger circuit 47.

The secondary winding 44 is similarly connected across the junctions *a* and *b* of the rectifier circuit 17 through a current limiting resistor 48 and a silicon controlled rectifier 49 having a trigger circuit 50.

The two trigger circuits 47 and 50 operate to render the respective silicon controlled rectifiers 46 and 49 conducting in phase with the reference voltages from the two respective secondary windings 43 and 44. Thus, this circuit operates such that when the trigger circuit 47 renders the rectifier 46 conducting a current I43 can flow on one half cycle through the secondary winding 43, through the silicon controlled rectifier 46 and across the rectifier circuit 16 through both paths between the diagonals *a* and *b* so that the rectifier circuit 16 can conduct to allow the flow of a current I13 between the junctions *c* and *d* and through the load 15 where the current I13 is smaller than the current I43.

On the next half cycle of the output from the source of reference voltage 40 the silicon controlled rectifier 46 becomes non-conducting and the silicon controlled rectifier 49 is rendered conducting to allow the current flow of a current I44 with a consequent flow of a smaller current I14 in the rectifier circuit 17 and the load 15.

The circuit of FIG. 2 can also be modified in accordance with the arrangement previously described in relation to FIG. 3.

Whilst the invention has been described in relation to two single phase arrangements it is clear that the arrangement can readily be adapted for polyphase operation.

If the load is constituted by a single of polyphase induction or synchronous motor then the speed of the motor can be varied according to the rate of change of the voltage supplied by the source 12 or the selsyn 60, as the case may be, and such a controlled motor is of particular use for operating the control rods of a nuclear reactor.

What I claim as my invention and desire to secure by Letters Patent is:

1. Apparatus for controlling the supply of electric current to a load, comprising in combination first and second bridge rectifier circuits, each having a pair of diagonally opposite junctions of the arms thereof for connection between the load and a source of alternating current power and being arranged normally to prevent the flow of current from the said source of alternating current power to the load, means for supplying an alternating reference voltage connected in series with a controllable rectifier across the other two junctions of the other arms of each bridge circuit, said reference voltage being in phase with the voltage supplied from said source, so as to render each bridge circuit in turn capable of conduction between said source and the load whereby to energize the load with full wave rectified current from said source, means comprising a power selsyn interposed between said source and said first and second bridge circuits for changing the phase of the voltage supplied to said bridge circuits whereby to change the polarity of the current supplied to the load, and means for rendering each said controllable rectifier conductive at a frequency determined by the frequency of the reference voltage whereby a current is caused to flow from said means for supplying said reference voltage through each bridge circuit in turn to bias the bridge circuits so that they allow current to flow from said source to the load.

2. Apparatus for controlling the supply of electric current to a load according to claim 1, in which the power selsyn includes a rotor and a stator, and means for rotating the rotor of the selsyn whereby the load may be supplied with a sinusoidal alternating current the frequency of which is proportional to the speed of rotation of the rotor of the selsyn.

References Cited

UNITED STATES PATENTS 2,968,758    1/1961    Ludbrook          321—70 X
3,246,231    4/1966    Clarke            321—69 X JOHN F. COUCH, *Primary Examiner.*

W. H. BEHA, *Assistant Examiner.*